(12) United States Patent
Akhlaque-e-rasul et al.

(10) Patent No.: US 10,086,787 B1
(45) Date of Patent: Oct. 2, 2018

(54) ACTIVE ROLLOVER PROTECTION

(71) Applicant: FORD GLOBAL TECHNOLOGIES, LLC, Dearborn, MI (US)

(72) Inventors: Shaikh Akhlaque-e-rasul, Windsor (CA); Zhenyan Gao, Northville, MI (US); William Moore Sherwood, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/472,743

(22) Filed: Mar. 29, 2017

(51) Int. Cl.
*B60R 21/13* (2006.01)
*B60R 21/013* (2006.01)
*B60R 21/00* (2006.01)

(52) U.S. Cl.
CPC ............ *B60R 21/13* (2013.01); *B60R 21/013* (2013.01); *B60R 2021/0018* (2013.01); *B60R 2021/01306* (2013.01)

(58) Field of Classification Search
CPC .......... B60R 2021/0018; B60R 2021/010306; B60R 2021/134; B60R 21/131; B60R 21/13; B62D 49/08
See application file for complete search history.

(56) References Cited

U.S. PATENT DOCUMENTS

| | | | | |
|---|---|---|---|---|
| 5,931,499 | A * | 8/1999 | Sutherland | B60R 21/00 180/282 |
| 6,394,738 | B1 * | 5/2002 | Springer | B62D 49/08 187/232 |
| 6,588,799 | B1 * | 7/2003 | Sanchez | B62D 37/00 280/755 |

(Continued)

FOREIGN PATENT DOCUMENTS

| | | |
|---|---|---|
| CN | 1958356 | 2/2006 |
| CN | 101885320 | 11/2010 |

(Continued)

OTHER PUBLICATIONS

Petrick Siegmund, Protective chassis for a tourer bus/coach protects bus passengers against serious injuries and death by reducing force of impact, Dec. 23, 2004, EPO, DE 103 24 976 All English Abstract (Year: 2004).*

(Continued)

*Primary Examiner* — James A English
(74) *Attorney, Agent, or Firm* — Jason Rogers; Price Heneveld LLP

(57) ABSTRACT

A rollover mitigation device for a motor vehicle comprises a frame mounted to a roof assembly within which is disposed a transversely mounted deployable rollover protector shaft. The frame comprises a pair of lateral mounting rails mounted to the roof assembly and a tubular cross member extending between the pair of lateral mounting rails. The deployable rollover protector shaft is substantially disposed within the tubular cross member when in the stowed position and is actuated from the stowed position to a locked deployed position by a spring disposed within the tubular cross member. A controller actuates a release lock to release the deployable rollover protector shaft to the deployed position upon a sensor detecting a roll angle of the motor vehicle exceeding a predetermined value. A deployment lock restrains the deployable rollover protector shaft in the deployed position.

18 Claims, 7 Drawing Sheets

(56) References Cited

U.S. PATENT DOCUMENTS

| | | | |
|---|---|---|---|
| 7,828,106 B1 | 11/2010 | Ratajski et al. | |
| 2006/0192353 A1* | 8/2006 | Schubert | B60R 21/0132 |
| | | | 280/5.502 |
| 2008/0122209 A1* | 5/2008 | Jayasuriya | B60R 3/002 |
| | | | 280/755 |
| 2011/0049853 A1* | 3/2011 | Horvath | B60S 9/02 |
| | | | 280/766.1 |
| 2011/0204609 A1* | 8/2011 | Gad Elkariem | B60R 21/13 |
| | | | 280/755 |
| 2015/0102591 A1* | 4/2015 | Perez De Larraya Sagues | |
| | | | B62D 49/08 |
| | | | 280/756 |
| 2016/0214557 A1* | 7/2016 | Villa | B62D 49/08 |

FOREIGN PATENT DOCUMENTS

| | | | |
|---|---|---|---|
| CN | 102393307 | 3/2012 | |
| CN | 102636355 | 8/2012 | |
| CN | 202641588 | 1/2013 | |
| CN | 104118387 | 10/2014 | |
| DE | 10324976 A1 * | 12/2004 | B60R 21/13 |
| KR | 20070043428 | 4/2004 | |

OTHER PUBLICATIONS

Petrick Siegmund, Protective chassis for a tourer bus/coach protects bus passengers against serious injuries and death by reducing force of impact, Dec. 23, 2004, EPO, DE 103 24 976 A1, Machine Translation of Description (Year: 2004).*

* cited by examiner

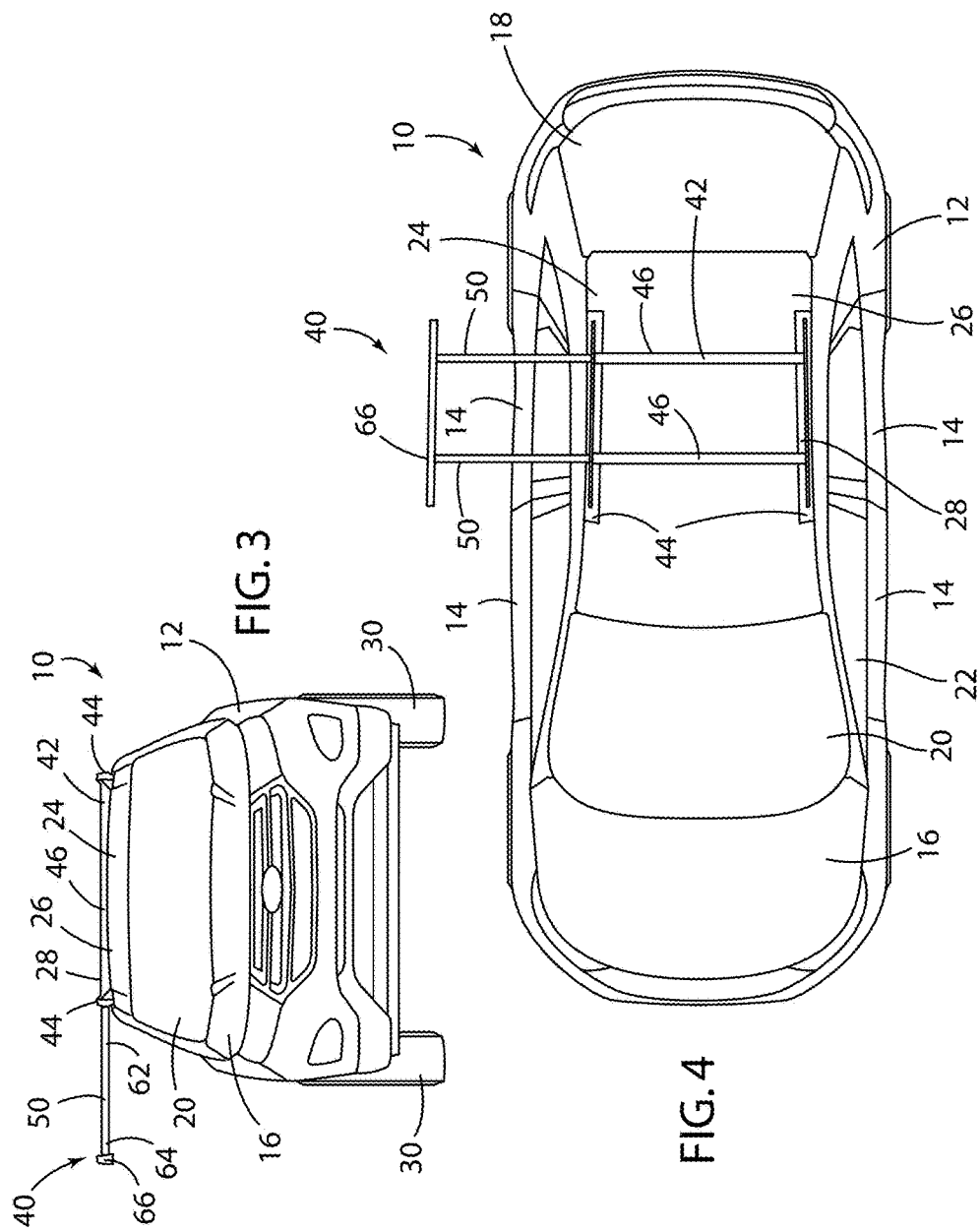

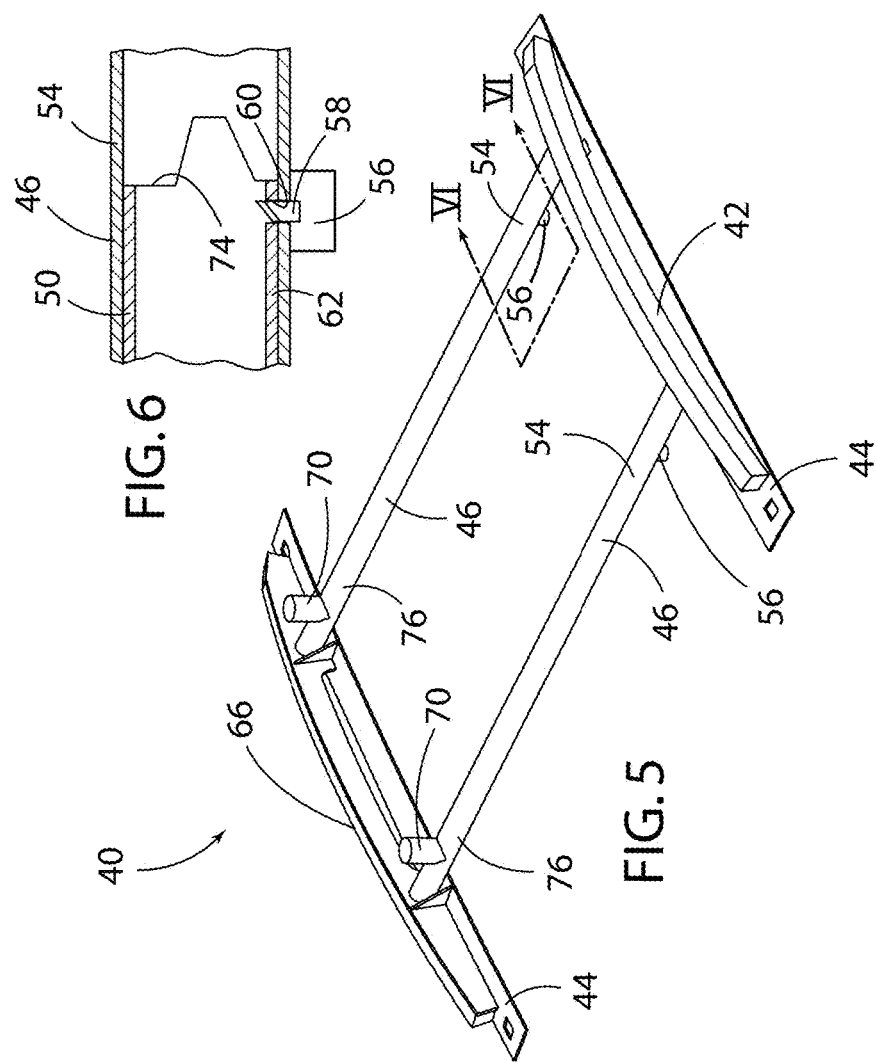

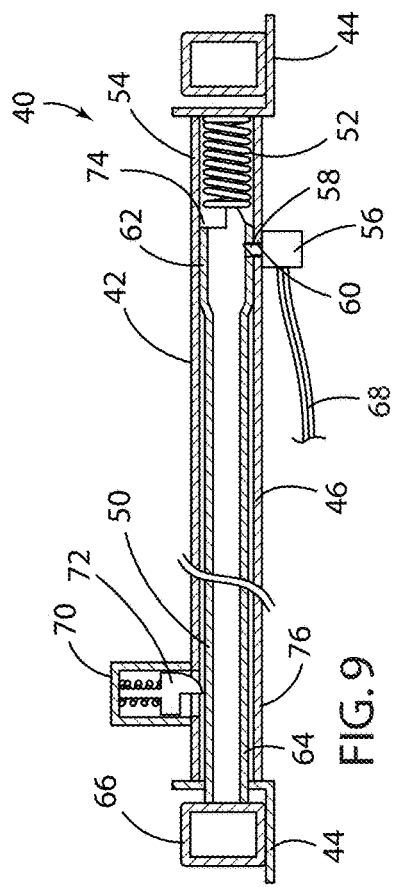
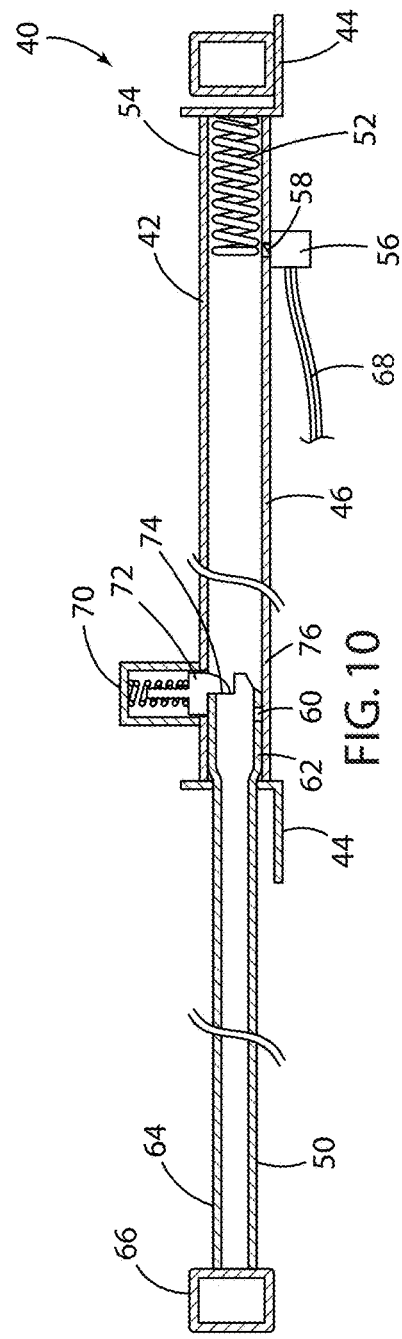
FIG. 9
FIG. 10

ACTIVE ROLLOVER PROTECTION

FIELD OF THE INVENTION

The present invention generally relates to an apparatus and method for mitigating a rollover event, particularly in the case of motor vehicles having a relatively high center of gravity, such as sport utility vehicles and, more particularly, to a spring loaded rollover protector shaft that is released when a critical rollover angle θ is exceeded.

BACKGROUND OF THE INVENTION

Motor vehicle rollover events present a challenge in the design of all classes of light motor vehicles, especially light trucks, such as pickups, sport utility vehicles, and vans. Light trucks, especially sport utility vehicles, tend to experience tripped and untripped rollover events at a higher rate than other vehicles. To avoid such rollover events, various vehicle stability control systems and driver assistance systems, such as lane departure warnings and tire pressure warnings, can assist the driver in avoiding and/or overcoming such an event. However, a practical active rollover protection system that would deploy in the event of a rollover event would be useful in addition to such vehicle stability control systems and driver assistance systems.

SUMMARY OF THE INVENTION

According to one aspect of the present invention, an active rollover protection system (ARPS) employs a rollover mitigation device for a motor vehicle that solves the aforementioned problem in an efficient and robust manner without major change for vehicle architecture structure. The rollover mitigation device comprises a frame mounted to a roof assembly within which is disposed a transversely mounted protector shaft, wherein the protector shaft is actuated from a locked stowed position to a locked deployed position; and a controller, wherein the controller actuates a release lock to release the protector shaft upon a sensor detecting a roll angle of the motor vehicle exceeding a predetermined value.

Embodiments of the first aspect of the invention can include any one or a combination of the following features:
- a deployment lock that restrains the protector shaft in the deployed position;
- a pair of lateral mounting rails mounted to the roof assembly and a tubular cross member extending between the pair of lateral mounting rails, wherein the deployable rollover protector shaft is substantially disposed and hidden within the tubular cross member when in the stowed position;
- a tubular cross member comprising a hollow tube, wherein the deployable rollover protector shaft slides within the tube between the stowed position and the deployed position;
- a tubular cross member having a substantially circular cross-section;
- a tubular cross member having a substantially rectangular cross-section;
- a resilient member disposed within the tube that actuates a protector shaft to the deployed position;
- a pair of tubular cross members and a pair of protector shafts, wherein one each of the pair of protector shafts is disposed within one each of the pair of tubular cross members and is slidable between the stowed position and the deployed position;
- an abutment bar disposed parallel to and proximate one of the pair of lateral mounting rails, wherein the abutment bar is attached to a distal end of each of the pair of protector shafts extending from the pair of the tubular cross members and is disposed a predetermined distance laterally from the vehicle when the protector shafts are in the deployed position;
- a pair of tubular cross members comprising a deployment lock having a locked condition that restrains one of the pair of protector shaft in the deployed position
- a release lock having a locked condition that restrains the rollover protector shaft in the stowed position and an unlocked condition that releases the rollover protector shaft
- a pair of release locks comprising an electrically actuated lock bolt operably coupled with one of the pair of tubular cross members and an opening in a proximate end of each of the pair of deployable rollover protector shafts within which the electrically actuated lock bolt is received when the one of the pair of deployable rollover protector shafts is in the stowed position to retain the one of the pair of deployable rollover shafts in the stowed position;
- each of the pair of electrically actuated bolt locks are mounted at a proximal end of the each of the pair of tubular cross members;
- a controller that simultaneously withdraws the electrically actuated lock bolt of each of the pair of release locks from the opening of each of the pair of deployable rollover shafts to cause the pair of springs to actuate the pair of rollover protector shafts to the deployed position
- a pair of deployment locks comprising a spring-loaded lock bolt operably coupled with one of the pair of tubular cross members and a striker base disposed on a proximate end of each of the pair of deployable rollover protector shafts that restrains the one of the pair of the deployable rollover protector shafts in the deployed position;
- a pair of spring-loaded lock bolts are mounted at a distal end of each of the pair of tubular cross member; and
- a release lock comprising an electrically actuated lock bolt operably coupled with the tubular cross member and mounted at a proximal end of the tubular cross member, and an opening in a proximate end of the deployable rollover protector shaft within which the electrically actuated lock bolt is received when the deployable rollover protector shaft is in the stowed position to retain the deployable rollover shaft in the stowed position, and a deployment lock comprises a spring-loaded lock bolt operably coupled with and mounted at a distal end of the tubular cross member that engages a striker base disposed on a proximate end of the deployable rollover protector shaft to restrain the deployable rollover protector shaft in the deployed position.

According to another aspect of the present invention, a rollover mitigation device for a motor vehicle having a roof assembly comprises a frame assembly rigidly mounted to the roof assembly, the frame comprising a pair of lateral mounting rails mounted to the roof assembly and a pair of tubular cross members extending between the pair of lateral mounting rails. A pair of deployable rollover protector shafts is each slidably disposed within one of the pair of tubular cross members, the deployable rollover protector shafts each having a stowed position and a deployed position, wherein a pair of springs each actuates one of the pair of rollover protector shafts to the deployed position. A pair of release locks is each operatively coupled with one of the pair of the deployable rollover protector shafts to maintain the one of the pair of rollover protector shafts in the stowed position, the pair of release locks having a locked condition that restrains one of the pair of rollover protector shafts in the stowed position and a release condition that releases one of the pair of rollover protector shafts. A pair of deployment locks is each operably coupled with one of the pair of the deployable rollover protector shafts and having a locked condition that restrains one of the pair of the deployable rollover protector shafts in the deployed position. A sensor is adapted to sense the roll angle of the motor vehicle relative a vertical plane, and a controller is operatively coupled with the sensor and the release lock, wherein the controller simultaneously actuates the pair of release locks to place the pair of release locks in the release condition and allow the pair of springs to actuate the pair of rollover protector shafts to the deployed position upon the sensor detecting a roll angle of the motor vehicle exceeding a predetermined roll angle relative the vertical plane.

According to a further aspect of the present invention, a rollover mitigation device for a motor vehicle comprises a frame mounted to a roof assembly within which is disposed a transversely mounted deployable rollover protector shaft. The frame comprises a pair of lateral mounting rails mounted to the roof assembly and a tubular cross member extending between the pair of lateral mounting rails. The protector shaft is substantially disposed within the tubular cross member when in the stowed position and is actuated from the stowed position to a locked deployed position by a spring disposed within the tubular cross member. A controller actuates a release lock to release the deployable rollover protector shaft to the deployed position upon a sensor detecting a roll angle of the motor vehicle exceeding a predetermined value. A deployment lock restrains the deployable rollover protector shaft in the deployed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a front view of a motor vehicle, wherein the transversely mounted deployable rollover protector shafts of the rollover mitigation device are in their deployed positions;

FIG. 4 is a top view of a motor vehicle, wherein the transversely mounted deployable rollover protector shafts of the rollover mitigation device of FIG. 3 are in their deployed positions;

FIG. 5 is a perspective front view of the frame assembly of the rollover mitigation device of FIG. 3, wherein the transversely mounted deployable rollover protector shafts are in their stowed positions;

FIG. 6 is a side cross-sectional view of the release lock of the rollover mitigation device of FIG. 3 taken along the line VI-VI shown in FIG. 5;

FIG. 9 is a cross-sectional view of a tubular cross member of the frame assembly of the rollover mitigation device of FIG. 3, wherein the transversely mounted deployable rollover protector shaft is in its stowed position; and FIG. 10 is a cross-sectional view of a tubular cross member of the frame assembly of the rollover mitigation device of FIG. 3, wherein the transversely mounted deployable rollover protector shaft is in its deployed position.

DETAILED DESCRIPTION OF THE PREFERRED EMBODIMENTS

Figure 1:
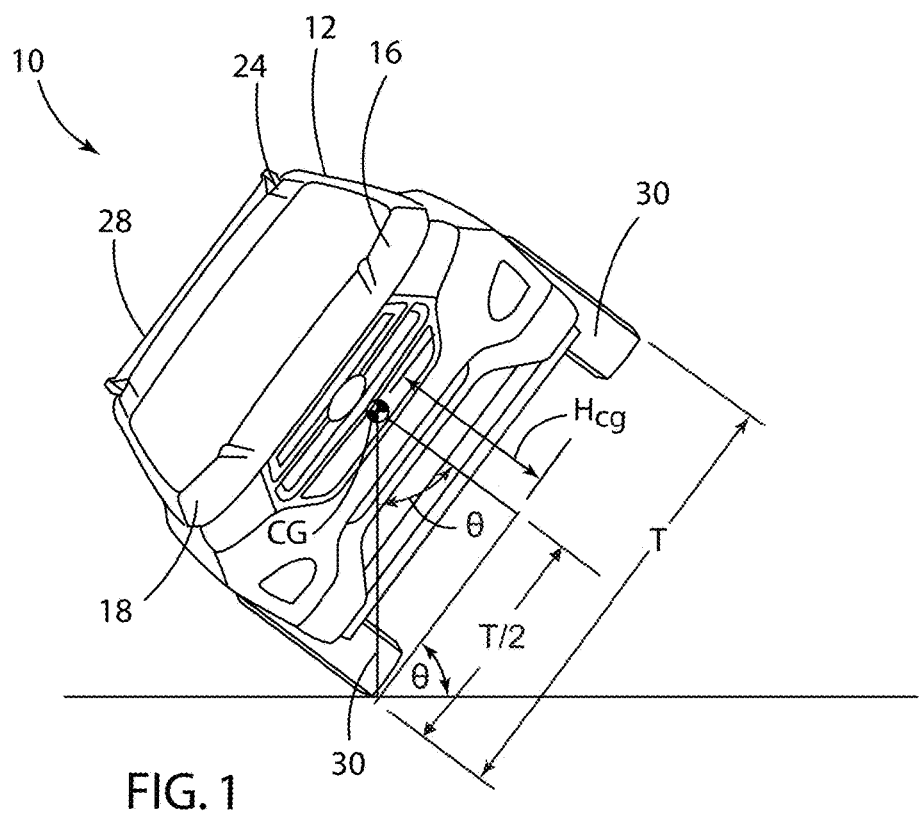
FIG. 1 is a front view of a motor vehicle experiencing a rollover event.
Figure 2:
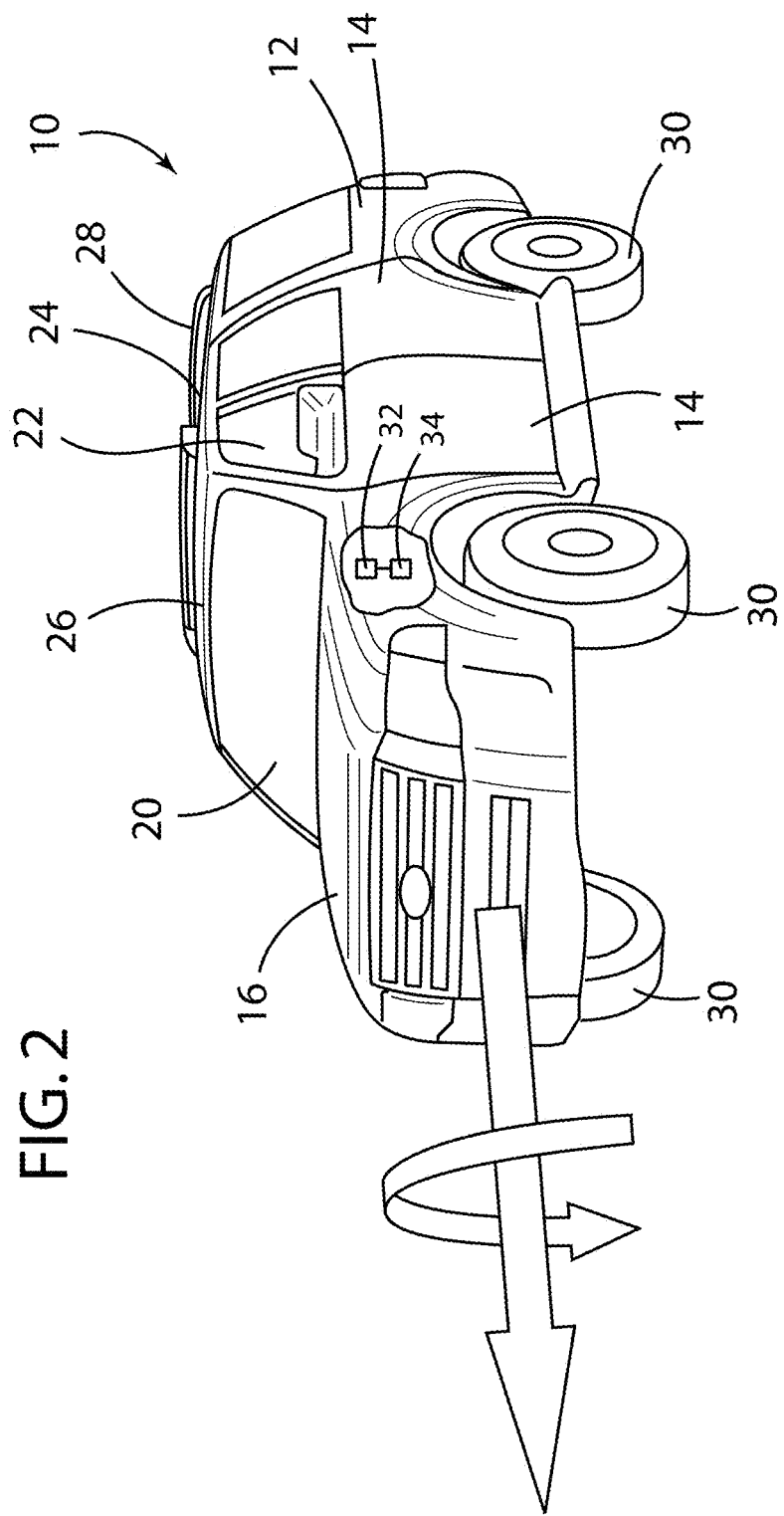
FIG. 2 is a front side perspective view of a motor vehicle depicting the roll axis of rotation.
Figure 7:
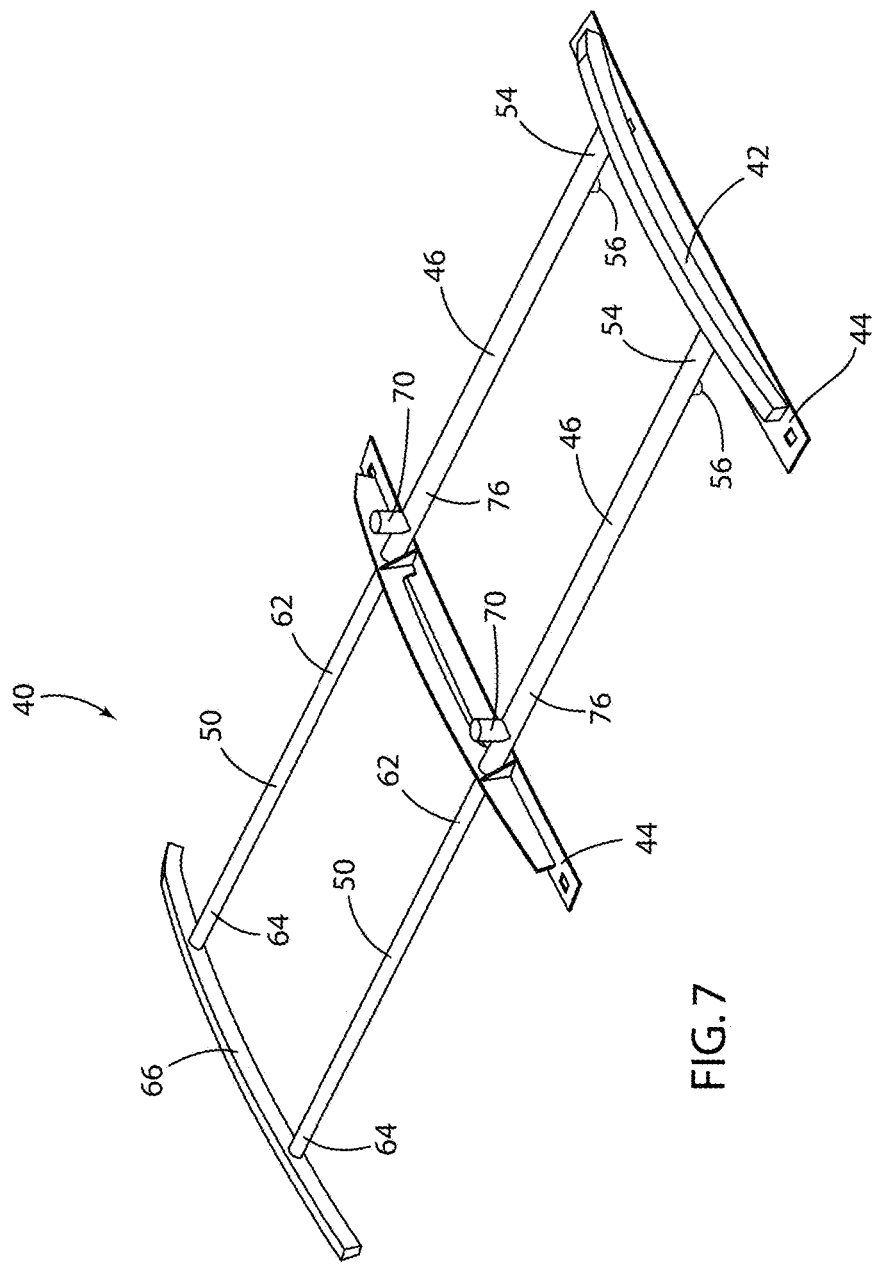
FIG. 7 is a perspective front view of the frame assembly of the rollover mitigation device of FIG. 3, wherein the transversely mounted deployable rollover protector shafts are in their deployed positions.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a motor vehicle. The motor vehicle 10 includes a body assembly 12 to which are assembled a plurality of passenger doors 14, a hood 16, tailgate 18, and windshield 20 to enclose the occupant compartment 22. The body assembly 12 further has an integral roof assembly 24 which includes an underlying structural support (not shown) to which an external body roof panel 26 is be attached, as is known. The motor vehicle may further optionally include luggage rail 28 mounted to the roof assembly 24. The motor vehicle 10 further includes a plurality of wheels 30 upon which the motor vehicle 10 is supported. The wheels 30 are operably coupled with the motor vehicle 10 via suspension and driveline components (not shown), as is known.

As shown in FIG. 1, the motor vehicle 10 can be described by its outward physical dimensions, as well as its center of mass CG in the vertical plane transverse to the longitudinal axis of the motor vehicle 10. That is, the motor vehicle 10 can be defined by its track width T between the wheels 30 and the height of the center gravity CG above the ground, or Hcg. With this information, a Static Stability Factor (SSF) for the vehicle 10 can be determined and which can be expressed as:

$$SSF = (0.5 \text{ of Track Width})/(\text{Height of the CG}) = T/(2*Hcg),$$

where $\Theta$ = angle at which the motor vehicle 10 will roll onto its side rather than back onto its wheels 30. The expression further reduces to and may be expressed as:

$$\text{Tan}(\Theta) = T/(2*Hcg)$$

Thus, in accordance with the aforementioned expression, it is possible to predict the angular threshold at which a rollover event will occur. In the past, vehicle stability controls that include roll stability controls (RSC) have been employed to avoid exceeding the rollover angle Θ, or the predetermined roll angle beyond which a rollover event will occur. Such RSC systems directly monitor the roll motion of the motor vehicle 10 via the use of a controller 32 and an operably coupled rollover sensor 34 capable of sensing the rollover angle Θ of the motor vehicle 10 that is sensitive to and helps to dynamically enhance the motor vehicle 10 stability in response to excessive roll motion of the motor vehicle 10. The challenge of such systems has been that they are robust to the extremes of customer usage and difficult to calibrate to be anticipatory without being too sensitive. Accordingly, while such RSC systems can respond to road-induced roll moments in attempt to assist the driver and avoiding further roll angle displacement, such systems do not provide for the protection in the event that a rollover event is actually initiated.

In accordance with the present disclosure, active rollover protection is provided via a rollover mitigation device 40. The rollover mitigation device 40 includes a frame assembly 42 mounted to the roof assembly 24. The frame assembly 42 is generally constructed of a pair of lateral mounting rails 44 mounted to the roof assembly 24 and one or more a cross members 46 extending transversely between and mounted to the pair of lateral mounting rails 44. Preferably, the frame assembly 42 is integrated with the luggage rail 28 described above. That is, an existing luggage rail 28 can be modified and equipped with the active components of the rollover mitigation device 40 disclosed herein.

The rollover mitigation device 40 further includes at least one transversely mounted deployable rollover protector shaft 50. The deployable rollover protector shaft 50 is preferably a rigid, high-strength metal tube. As perhaps best shown in FIGS. 9 and 10, the deployable rollover protector shaft 50 is mounted within a cross member 46 and has a locked stowed position and a locked deployed position. Preferably, the cross member 46 comprises a high-strength, hollow metal tube and the deployable rollover protector shaft 50 is received and slides within the tubular cross member 46 between the stowed position and the deployed position. The tubular cross member 46 preferably has a substantially circular cross-section, but may have a substantially rectangular, triangular, hexagonal or other geometric cross-sectional configuration. As shown in FIG. 5, the deployable rollover protector shaft 50 is normally and substantially disposed and hidden within the tubular cross member 46 when in the stowed position. Thus, when in the stowed position, the rollover mitigation device 40 looks very much like an ordinary luggage rail 28.

As is common in such ordinary luggage rails 28, preferably the frame assembly 42 includes at least a pair of tubular cross members 46 extending between the pair of lateral mounting rails 44, each containing therein a deployable rollover protector shaft 50 that may be slidingly reciprocated therein between the stowed position and the deployed position. While a pair of deployable rollover protector shafts 50 are disclosed in the preferred embodiment described herein, with reference to such a pair of deployable rollover protector shafts 50 hereinafter, it is contemplated that a singular deployable rollover protector shaft 50 of sufficient robustness and strength could be mounted within a singular tubular cross member 46 and still advantageously employ the benefits of the rollover mitigation device 40 described herein.

Each of the pair of tubular cross members 46 so provided further preferably includes a resilient member 52 disposed within and the near the proximal end 54 of the tubular cross member 46 that actuates the deployable rollover protector shaft 50 from the stowed position to the deployed position. While the resilient member 52 preferably comprises a mechanical coiled compression spring, as best shown in FIGS. 9 and 10, is contemplated that other resilient members 52, such as gas-filled tubes, may be employed. Further, it is contemplated that pyrotechnics, similar to those employed in airbag technology, could be employed to actuate the deployable rollover protector shaft 50 to the deployed position, as further described below.

In order to resist the resilient members 52 actuating the pair of deployable rollover protector shafts 50 to the deployed position, the rollover mitigation device 40 further preferably includes a pair of release locks 56, each operably coupled with one of the pair of tubular cross members 46. Each of the pair of release locks 56 includes an electrically actuated lock bolt 58 operably coupled with one of the pair of tubular cross members 46 and an opening 60 in a proximate end 62 of each of the pair of deployable rollover protector shafts 50 within which the electrically actuated lock bolt 58 is received when the deployable rollover protector shafts 50 are in the stowed position. With the electrically actuated lock bolt 58 captured within the opening 60 at the proximate end 62 of the deployable rollover protector shafts 50, the deployable rollover protector shafts 50 are maintained in the stowed position. Each of the pair of electrically actuated bolt locks 58 is preferably mounted at the proximal end 54 of each of the pair of tubular cross members 46.

As a potential rollover event arises and proceeds to evolve, the rollover sensor 34 sends a signal to the controller 32 indicative of the instantaneous roll angle Θ of the motor vehicle 10. When the controller 32 determines that the instantaneous roll angle Θ of the motor vehicle 10 exceeds a predetermined value corresponding to a predetermined roll angle Θ beyond which a rollover event will occur, the controller 32 actuates the release locks 56 via line 68 to release the pair of deployable rollover protector shafts 50. Particularly in the case where there are a pair of deployable rollover protector shafts 50, actuation of the controller 32 preferably simultaneously withdraws the electrically actuated lock bolts 58 of each of the pair of release locks 56 from the opening 60 of each of the pair of deployable rollover protector shafts 50 to cause the pair of springs 52 to simultaneously actuate the pair of deployable rollover protector shafts 50 to the deployed position.

Figure 8A:
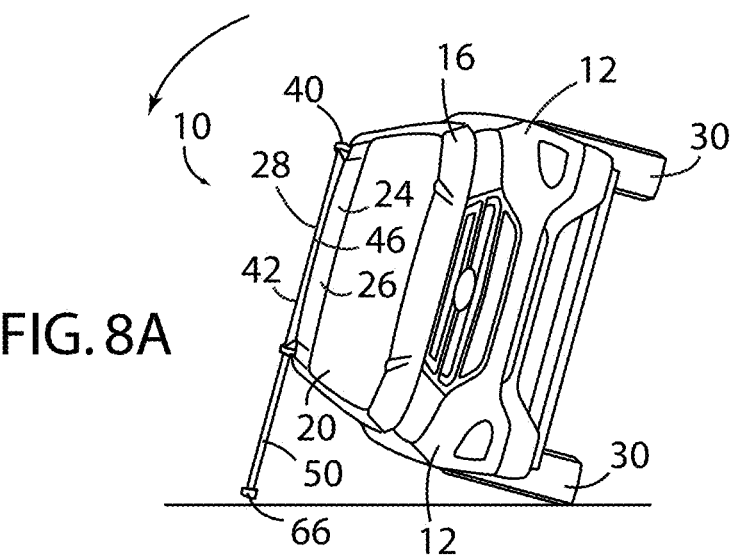
FIG. 8A is front view of a motor vehicle experiencing a rollover event and just prior to contact of the rollover mitigation device of FIG. 3 with the ground, wherein the transversely mounted deployable rollover protector shafts of the rollover mitigation device of FIG. 3 are in their deployed positions.
Figure 8B:
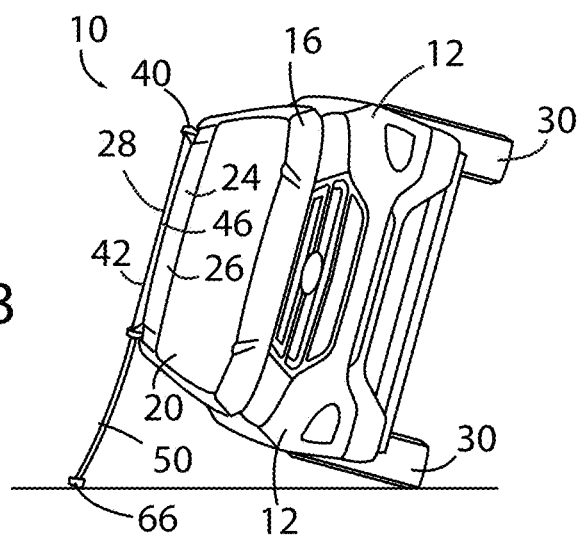
FIG. 8B is a front view of a motor vehicle experiencing a rollover event and just subsequent to contact of the rollover mitigation device of FIG. 3 with the ground, wherein the transversely mounted deployable rollover protector shafts of the rollover mitigation device of FIG. 3 remain in their deployed positions.

As shown in FIGS. 8A-8B, the pair of deployable rollover protector shafts 50 each extends laterally from the motor vehicle 10 a predetermined distance when the pair of deployable rollover protector shafts 50 are in the deployed position. The predetermined distance will vary from motor vehicle 10 to motor vehicle 10 and should be at least Hcg/cos Θ. As the motor vehicle 10 rolls over, the distal ends 64 of the deployable rollover protector shafts 50 come into contact with the ground. However, since the first contact of the motor vehicle 10 with the ground is through the distal ends 64 of the deployable rollover protector shafts 50, rather than the side of the motor vehicle 10, the lateral angular momentum of the motor vehicle 10 is abruptly terminated and the motor vehicle 10 is less likely to continue rolling. In simulations of the rollover mitigation device 40, motor vehicle 10 ultimately moves away the ground. Thus, the rollover event is prevented and the motor vehicle 10 ultimately comes to a rest supported on the pair of deployable rollover protector shafts 50.

Preferably, the rollover mitigation device 40 further includes an abutment bar 66, again preferably fabricated from a high-strength metal, disposed parallel to and proximate one of the pair of lateral mounting rails 44 when the pair of deployable rollover protector shafts 50 is in the deployed position, wherein the abutment bar 66 is attached to a distal end 64 of each of the pair of deployable rollover protector shafts 50 extending from the pair of tubular cross members 46. The abutment bar 66, like the distal ends 64 of the pair of deployable rollover protector shafts 50, is displaced a predetermined distance laterally from the motor vehicle 10 when the pair of deployable rollover protector shafts 50 are in the deployed position.

To maintain the deployable rollover protector shafts 50 in the deployed position after the deployable rollover protector shafts 50 have been released and deployed, a deployment lock 70 is employed to restrain the deployable rollover protector shafts 50 within the tubular cross members 46. According to the preferred embodiment, each of the pair of deployment locks 70 comprise a spring-loaded lock bolt 72 operably coupled with one of the pair of tubular cross members 46 and a striker base 74 disposed on a proximate end of each of the pair of deployable rollover protector shafts 50, as shown in FIGS. 6 and 10. When the deployable rollover protector shafts 50 move to the deployed position, the spring-loaded lock bolt 72 moves past the striker base 74 and extends radially into the tubular cross member 46 and into abutting relation with the striker base 74 provided on the proximate end 62 of each of the pair of deployable rollover protector shafts 50 to restrain each of the pair of deployable rollover protector shafts 50 in the deployed position. Preferably, each of the spring-loaded lock bolts 72 of the pair of deployment locks 70 are mounted at a distal end 76 of each of the pair of tubular cross members 46.

As noted above, the luggage rail 28 can be equipped with the active rollover mitigation device 40 of the present disclosure. In the locked condition, the active rollover mitigation device 40 looks very similar to an ordinary luggage rail 28. As the deployable rollover protector shaft 50 is spring loaded, the deployable rollover protector shaft 50 will be released when the critical rollover angle θ is exceeded. The critical rollover angle θ, based on the signal provided by the rollover sensor 34, is utilized by the controller 32 to initiate deployment of the rollover mitigation device 40. The deployable rollover protector shaft 50 is then placed in a locked condition after its release. The rollover mitigation device 40 thus seeks to stop the rollover event and protect the occupant (not shown), as well as the motor vehicle 10, as the body assembly 12 of the motor vehicle 10 does not touch the ground. It should be further appreciated that the controller 32 and sensor 34 may be combined with the supplemental restraint system (not shown) of the motor vehicle 10, whereby side airbags provided to mitigate rollover events may also deployed simultaneously.

Further, while as shown in the preferred embodiment, only a single side (that is, the passenger side) of the motor vehicle 10 has been provided with the rollover mitigation device 40 disclosed herein, it is contemplated that a mirror image system may be provided to provide rollover mitigation on the driver side. In this event, it is contemplated that the tubular cross members 46 and deployable rollover protector shafts 50 for each of the passenger and driver side may simply be arranged in an alternating sequence in the frame assembly 42 and directed toward either of the passenger or driver side, within abutment bar 66 provided on each side of the frame assembly 42 of the rollover mitigation device 40. Thus, the rollover mitigation device 40, in accordance with the preferred embodiment disclosed herein, would appear as a luggage rail 28 having four tubular cross members 46.

The rollover mitigation device 40 disclosed herein is thus relatively easy to install and in fact can be attached to the roof assembly 24 of the motor vehicle 10 in much the same way as the luggage rails 28 are currently attached, where the rollover mitigation device 40 is in fact integrated with a luggage rail 28. The rollover mitigation device 40 disclosed herein further provides an efficient and lightweight, yet robust, solution for rollover protection. The rollover mitigation device 40 disclosed herein can also be applied to virtually any motor vehicle 10 and is especially adapted for applications to sport utility vehicles.

It will be understood by one having ordinary skill in the art that construction of the present disclosure and other components is not limited to any specific material. Other exemplary embodiments of the disclosure disclosed herein may be formed from a wide variety of materials, unless described otherwise herein.

The methods, devices, and systems described above may be implemented in many different ways in many different combinations of hardware, software or both hardware and software. For example, all or parts of the system may include circuitry in the controller 32, a processor, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A rollover mitigation device for a motor vehicle comprising:
    a frame assembly entirely mounted to a roof assembly within which is disposed a transversely mounted protector shaft, wherein the protector shaft is actuated from a locked stowed position to a locked deployed position;
    a deployment lock operably coupled with the frame assembly and the protector shaft and having a locked condition that restrains the protector shaft in the locked deployed position, the deployment lock comprising a spring-loaded lock bolt operably coupled with the frame assembly and disposed to move into abutting relation with and engage a striker base disposed on a proximate end of the protector shaft when the spring-loaded lock bolt is in a deployed position and thereby restrain the protector shaft in the locked deployed position, and
    a controller, wherein the controller actuates a release lock to release the protector shaft upon a sensor detecting a roll angle of the motor vehicle exceeding a predetermined value.

2. The rollover mitigation device of claim 1, wherein the frame assembly comprises a pair of lateral mounting rails mounted to the roof assembly and a tubular cross member extending between the pair of lateral mounting rails and wherein the protector shaft is substantially disposed and hidden within the tubular cross member when in the stowed position.

3. The rollover mitigation device of claim 2, wherein the tubular cross member comprises a hollow tube and the protector shaft slidingly reciprocates within the hollow tube between the stowed position and the deployed position.

4. The rollover mitigation device of claim 3, wherein the hollow tube has a substantially circular cross section.

5. The rollover mitigation device of claim 3, wherein the hollow tube has a substantially rectangular cross section.

6. The rollover mitigation device of claim 3, further comprising a resilient member disposed within the hollow tube that actuates the protector shaft to the deployed position.

7. The rollover mitigation device of claim 2, further comprising a pair of tubular cross members and a pair of protector shafts, wherein one each of the pair of protector shafts is disposed within one each of the pair of tubular cross members and is slidable between the stowed position and the deployed position.

8. The rollover mitigation device of claim 7, further comprising an abutment bar disposed parallel to and proximate one of the pair of lateral mounting rails, wherein the abutment bar is attached to a distal end of each of the pair of protector shafts extending from the pair of the tubular cross members and is disposed a predetermined distance laterally from the vehicle when the protector shafts are in the deployed position.

9. The rollover mitigation device of claim 7, wherein each of the pair of tubular cross members comprises a deployment lock having a locked condition that restrains one of the pair of protector shaft in the deployed position, and wherein each of the pair of deployment locks comprises a spring-loaded lock bolt operably coupled with one of the pair of tubular cross members extending radially into the tubular cross member when in a deployed position to move into abutting relation with and engage a striker base disposed on a proximate end of each of the pair of deployable rollover protector shafts and thereby restrain the one of the pair of the deployable rollover protector shafts in the deployed position.

10. The rollover mitigation device of claim 1, wherein the release lock has a locked condition that restrains the protector shaft in the stowed position and an unlocked condition that releases the protector shaft.

11. A rollover mitigation device for a motor vehicle having a roof assembly, the rollover mitigation device comprising:
    a frame assembly entirely and rigidly mounted to the roof assembly, the frame assembly comprising a pair of lateral mounting rails mounted to the roof assembly and a pair of tubular cross members extending between the pair of lateral mounting rails;

a one of a pair of deployable rollover protector shafts each slidably disposed within one of the pair of tubular cross members, the deployable rollover protector shafts each having a stowed position and a deployed position;

a pair of springs each actuating one of the pair of rollover protector shafts to the deployed position;

a pair of release locks each operatively coupled with one of the pair of the deployable rollover protector shafts to maintain the one of the pair of deployable rollover protector shafts in the stowed position, the pair of release locks having a locked condition that restrains the one of the pair of deployable rollover protector shafts in the stowed position and a release condition that releases the one of the pair of deployable rollover protector shafts;

a pair of deployment locks each operably coupled with one of the pair of the deployable rollover protector shafts and having a locked condition that restrains one of the pair of the deployable rollover protector shafts in the deployed position, each of the pair of deployment locks comprises a spring-loaded lock bolt operably coupled with one of the pair of tubular cross members extending radially into the tubular cross member when in a deployed position to move into abutting relation with and engage a striker base disposed on a proximate end of each of the pair of deployable rollover protector shafts and thereby restrain the one of the pair of the deployable rollover protector shafts in the deployed position;

a sensor adapted to sense the roll angle of the motor vehicle relative a vertical plane; and a controller operatively coupled with the sensor and the release lock, wherein the controller simultaneously actuates the pair of release locks to place the pair of release locks in the release condition and allow the pair of springs to actuate the pair of rollover protector shafts to the deployed position upon the sensor detecting a roll angle of the motor vehicle exceeding a predetermined roll angle relative the vertical plane.

12. The rollover mitigation device of claim 11, further comprising an abutment bar disposed parallel to and proximate one of the pair of lateral mounting rails when the pair of protector shafts are in the deployed position, wherein the abutment bar is attached to a distal end of each of the pair of protector shafts extending from the pair of tubular cross members and is displaced a predetermined distance laterally from the vehicle when the pair of deployable rollover protector shafts are in the deployed position.

13. The rollover mitigation device of claim 11, wherein each of the pair of release locks comprise one of a pair of electrically actuated lock bolts operably coupled with one of the pair of tubular cross members and an opening in a proximate end of each of the pair of deployable rollover protector shafts and one of the pair of the electrically actuated lock bolts is received when the one of the pair of deployable rollover protector shafts is in the stowed position to retain the one of the pair of deployable rollover shafts in the stowed position.

14. The rollover mitigation device of claim 13, wherein each of the pair of electrically actuated bolt locks are mounted at a proximal end of the each of the pair of tubular cross members.

15. The rollover mitigation device of claim 13, wherein actuation of the controller simultaneously withdraws the electrically actuated lock bolt of each of the pair of release locks from the opening of each of the pair of deployable rollover protector shafts to cause the pair of springs to actuate the pair of deployable rollover protector shafts to the deployed position.

16. The rollover mitigation device of claim 11, wherein each of the spring-loaded lock bolts of the pair of deployment locks are mounted at a distal end of each of the pair of tubular cross members.

17. A rollover mitigation device for a motor vehicle comprising:

a frame assembly entirely mounted to a roof assembly within which is disposed a transversely mounted deployable rollover protector shaft, wherein the frame assembly comprises a pair of lateral mounting rails mounted to the roof assembly and a tubular cross member extending between the pair of lateral mounting rails and wherein the deployable rollover protector shaft is substantially disposed within the tubular cross member when in the stowed position and is actuated from the stowed position to a locked deployed position by a spring disposed within the tubular cross member;

a controller that actuates a release lock to release the deployable rollover protector shaft to the deployed position upon a sensor detecting a roll angle of the motor vehicle exceeding a predetermined value; and a deployment lock that restrains the deployable rollover protector shaft in the deployed position, the deployment lock further comprising a spring-loaded lock bolt operably coupled with the tubular cross member and extending radially into the tubular cross member when in a deployed position to move into abutting relation with and engage a striker base dispensed on a proximate end of the deployable rollover protector shaft and thereby retrain the deployable rollover protector shaft in thy deployed position.

18. The rollover mitigation device of claim 17, wherein the release lock comprises an electrically actuated lock bolt operably coupled with the tubular cross member and mounted at a proximal end of the tubular cross member, and an opening in a proximate end of the deployable rollover protector shaft within which the electrically actuated lock bolt is received when the deployable rollover protector shaft is in the stowed position to retain the deployable rollover protector shaft in the stowed position; and the deployment lock comprises a spring-loaded lock bolt operably coupled with and mounted at a distal end of the tubular cross member that engages a striker base disposed on a proximate end of the deployable rollover protector shaft to restrain the deployable rollover protector shaft in the deployed position.

* * * * *

UNITED STATES PATENT AND TRADEMARK OFFICE
CERTIFICATE OF CORRECTION

PATENT NO. : 10,086,787 B1
APPLICATION NO. : 15/472743
DATED : October 2, 2018
INVENTOR(S) : Akhlaque-e-rasul et al.

Page 1 of 1

It is certified that error appears in the above-identified patent and that said Letters Patent is hereby corrected as shown below:

In the Claims

Column 11:
Claim 11, Line 23;
"comprises" should be --comprising--.

Column 12:
Claim 17, Line 39;
"dispensed" should be --disposed--.
Claim 17, Line 42;
"thy" should be --the--.

Signed and Sealed this
Eighth Day of January, 2019

Andrei Iancu
*Director of the United States Patent and Trademark Office*